Patented Jan. 21, 1936

2,028,307

UNITED STATES PATENT OFFICE 2,028,307

PROCESS FOR PREPARING CERESIN

Peter J. Wiezevich, Elizabeth, N. J., assignor to Standard Oil Development Company, a corporation of Delaware No Drawing. Application June 13, 1932, Serial No. 617,055

2 Claims. (Cl. 196—13)

This invention relates to a method for obtaining ceresin from crude ozokerite.

Ozokerite is a natural earth wax. It occurs principally in Galicia although small deposits are found in Russia, Persia and in the United States in the States of Utah and Colorado. In its crude state it is dark green to dark brown or black in color. It is an amorphous wax of high melting point and is especially useful in the electrical industry for insulating purposes; is also used in shoe, floor and furniture polishes, in cosmetics, leather dressings and for other purposes requiring a waxy material of high melting point and plasticity. However, before it can be used for any of these purposes it must be refined, the refined product being called ceresin. Ceresin has a color range from light brown through yellow to snow white and a melting point of between 150 and 175° F.

Crude ozokerite is ordinarily refined to produce ceresin by treatment with fuming sulfuric acid at temperatures of about 250 to 350° F. followed generally by filtration through charcoal. This method of purification is expensive and involves the use of special equipment due to the fact that fuming sulfuric acid is used at high temperatures. Moreover the ceresin so produced sometimes has a tendency to become dark colored on ageing.

I have now found that ceresin may be obtained from crude ozokerite by extraction with light hydrocarbons such as propane and butane or mixtures thereof, preferably followed by filtration of the extract in the light hydrocarbon solution through a bed of solid adsorptive media such as clay, charcoal, bone black and the like. This method of refining ozokerite is less expensive than the sulfuric acid method, is less troublesome from an operating standpoint and produces yields of pure white ceresin of above 90%.

My improved method will be fully understood from the following description: The crude ozokerite is first dissolved at a temperature above its melting point in a light hydrocarbon such as liquefied propane. It is preferable to use about 8 to 12 volumes of light hydrocarbon per volume of molten ozokerite and the temperature should generally be maintained above 160 to 175° F. Pressure should be maintained sufficient to retain the light hydrocarbon in liquid phase at the temperature of working. Following complete admixture of the crude material with the light hydrocarbon, the flux is allowed to stand until all the material remaining undissolved has settled. The sludge comprises a black tarry mass which can be readily removed from the lighter colored liquid above. The waxy material recovered from this solution will be sufficiently pure for some purposes. It has a brown to light brown color somewhat resembling that of beeswax. However if further purification is desired the clear solution may be heated up to a temperature approaching the critical temperature of the light hydrocarbon solvent. Thus for example, if propane is used as the solvent the initial extraction may be carried out at a temperature of say 190° F. and the clear liquid may then be heated up further to a temperature between 195 and 200° F. which is near the critical temperature of propane (204° F.). As the temperature approaches the critical temperature of the solvent a portion of the wax is thrown out of solution and carries with it a substantial proportion of the dark colored material contained in it. This separated material may then be removed and the wax recovered from the clear liquid. The wax obtained in this way will have a color range from light brown to dark yellow.

A ceresin of still lighter color may be prepared by filtering the clear solution at a temperature above the melting point of the wax, and preferably at about the same temperature at which a portion of the material was thrown out in the preceding step, through a bed of solid adsorptive material such as clay. Percolation of this propane solution through clay is not only extremely rapid but much smaller quantities of clay than would be necessary if the filtration were carried out in naphtha solution may suffice to obtain the same degree of purification. Thus for example about 100 grams of clay may be sufficient for 1200 grams of solution. It will be understood that the amount of clay used will depend upon what degree of purification is desired.

After filtration of the solution the ceresin is recovered therefrom by evaporating off the solvent. The recovered solvent may of course be used to extract additional crude material. The purified product or ceresin has a melting point between 150 and 175° F. and is stable in color, even after standing for prolonged periods.

The higher melting point ceresins are as a rule more valuable than those of low melting point. The ceresin obtained by my method may be conveniently separated into fractions of high and low melting point during the process of purification by cooling the solution of wax in propane to below the melting point of the ozokerite whereupon the higher melting point fractions will be precipitated, leaving the low melting point fractions in solution. This separation into fractions of different melting point may be carried out either before or after the percolation through clay and each fraction may then be handled separately.

For example, 235 grams of a ceresin obtained by extracting ozokerite with 1200 grams of propane at 194° F. and having a melting point of 153° F. are dissolved in propane and the solution cooled to 72° F. 118 grams of wax having a melting point of 162° F. are precipitated, and 117 grams of wax having a melting point of 129.5° F. remain in solution.

In general the light hydrocarbons suitable for use in this method comprise hydrocarbons of 3 to 5 carbon atoms or mixtures of these. The presence of small amounts of higher or lower boiling hydrocarbons is not objectionable but in general the major proportion of the solvent should comprise hydrocarbons of 3 to 5 carbon atoms. The light hydrocarbons may be obtained from any suitable source. For example, the uncondensable gases obtained in the cracking of higher boiling hydrocarbons and in the stabilization of gasolines are generally rich in propane and butane and these gases furnish an especially convenient source of the preferred light hydrocarbons.

The temperature at which the extraction is carried out should in general be above the melting point of the crude ozokerite but preferably not above the critical temperature of the solvent. The pressure used should be sufficient to retain the light hydrocarbons in liquid phase and this will in general range between 25 and 50 atmospheres or more.

It will be understood that various modifications of my method may be made. Thus for example, a preliminary purification of the ozokerite may be effected with the light hydrocarbons and then further purification may be accomplished by the fuming sulfuric acid treatment of the partially purified material and vice versa. It is preferred however to accomplish the entire purification in accordance with the method described above. Various other modifications of the process may be made without departing from the scope of the invention.

As an example of the application of my method, a crude black ozokerite having a melting point of 170° F. is dissolved at about this temperature in 10 volumes of liquid propane. A black tar amounting to about 3% of the original ozokerite is precipitated leaving a dark brown colored wax in solution. This black tarry material is separated from the solution. The clear solution is then heated up to a temperature of about 196° F. whereupon a portion of the wax is precipitated and carries with it a substantial proportion of the dark colored material. This precipitated material is removed. The wax remaining in solution then has a color of about 2 Robinson when molten. This color is about that of crude beeswax. For many purposes ceresin of this color is quite satisfactory.

A much lighter colored ceresin or bleached ceresin is obtained by percolating the last mentioned solution through a bed of No. 1 Attapulgus clay whereupon a filtrate containing a wax having a color of better than 25 Robinson may be obtained. The ceresin recovered from the first portions of the filtrate is snow white and of the highest purity. As the adsorptive power of the clay is exhausted, the filtrate becomes increasingly colored. The ceresin recovered from this filtrate may be used for the intermediate grades or if desirable, the filtrate may be repercolated through fresh clay to obtain additional snow white product.

This invention is not limited by any theory of its mechanism nor by any details which have been given merely for purposes of illustration but is limited only in and by the following claims in which I wish to claim all novelty inherent in the process.

I claim:

1. Process for obtaining ceresin from ozokerite which comprises treating the ozokerite at a temperature above its melting point with a light hydrocarbon solvent comprising a major proportion of hydrocarbons having between 3 and 5 carbon atoms, and under a pressure sufficient to retain the light hydrocarbons in liquid phase at the temperature of working removing any material remaining undissolved at this temperature, heating the solution without substantial intermediate cooling to a temperature close to the critical temperature of the solvent whereby a portion of the ozokerite is precipitated and carries with it a substantial proportion of the colored material contained therein, removing this precipitated material, filtering the remaining solution through a bed of finely divided clay, and recovering the ceresin from the filtered solution.

2. Process according to claim 1 in which the ozokerite is first treated with a light hydrocarbon comprising a hydrocarbon of 3 carbon atoms, at a temperature of about 190° F., the material remaining undissolved is removed and the solution is then heated up without substantial intermediate cooling to a temperature between 195 and 200° F., the precipitated material is removed and the remaining solution is filtered through a bed of clay at a temperature of about 190° F.

PETER J. WIEZEVICH.